A. Pond.
Making Carriage Bolts.
Nº 47,245.  Patented Apr. 11, 1865.
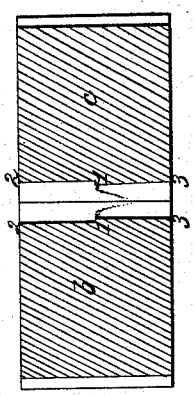
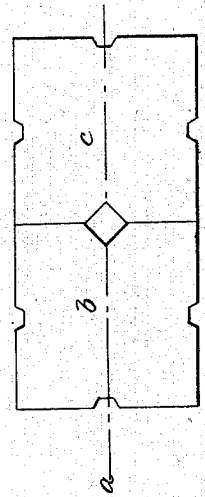
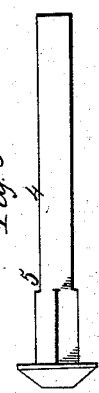
Witnesses;
Chas. L. Beecher
Leroy P. Matthews
Inventor;
Alvin Pond

UNITED STATES PATENT OFFICE.

ALVIN POND, OF HAMDEN, ASSIGNOR TO F. H. LAMSON AND W. W. WOODRUFF, OF MOUNT CARMEL, CONNECTICUT.

CARRIAGE-BOLT.

Specification forming part of Letters Patent No. 47,245, dated April 11, 1865.

*To all whom it may concern:*

Be it known that I, ALVIN POND, of Hamden, in the county of New Haven and State of Connecticut, have invented, made, and applied to use a certain new and useful Improvement in the Manufacture of Bolts for Carriages, &c.; and I do hereby declare the following to be a full, clear, and exact description of the said invention, reference being had to the annexed drawings, making part of this specification, wherein—

Figure 1 is a plan of the divided die employed for making my said bolt. Fig. 2 is a section through said dies at the line $a\, a$. Fig. 3 is an elevation of the bolts, and Fig. 4 is a cross-section in larger size of a bolt made in my improved manner.

Similar letters denote the same parts.

Bolts for carriages have heretofore been made from a round rod of iron with a squared portion near the head to prevent them from turning in the hole or mortise in which they may be introduced. Said square has been produced by dies that have compressed the round rod into a somewhat square shape, aided by the upsetting of the rod in the act of heading the same.

The nature of my said invention consists not in the manufacture of bolts for carriages, &c., with a square body next to the head, but in terminating said square body with sharp corners at the point where the rounded portion commences, said bolt being formed in a die from a round bar of iron and headed simultaneously with the formation of said square body. The object in forming the bolt with sharp corners at the termination of the squared portion is to prevent the bolt splitting any piece of wood when driven into a hole or mortise, as said square corners score out the wood and do not have any outward wedging action, as is the case with bolts that are formed with a square tapering up toward the head from the round body; and a bolt made on my plan has a much better and more finished appearance than those heretofore made from round iron.

In the drawings, $b$ and $c$ are the blocks forming my die. They are to be of the required size and made by planing the sides that are to come together with a groove, after which said sides are set together and the blocks clamped to each other, and a reamer introduced to bore a hole that is of the same diameter, or nearly so, as the rod of iron to be operated on. Said hole is slightly tapering. I then open the die, and by means of suitable chisels and files form the square recess of the proper size and length, terminating with a sharp angle, or corner, as at 1 1, the squared portion extending from there to the face of the die at 2, while the round cavity extends to the back of the die at 3. Dies formed in this manner are to be used for forming bolts in any well known or desired machine. The dies are pressed tightly together upon a heated rod to hold the same, while the head is struck up. The dies formed as aforesaid hold the rod very firmly and slightly reduce the diameter of the bolt to a taper from 4 to 5. (See Fig. 3.)

What I claim, and desire to secure by Letters Patent, is—

Manufacturing bolts from round iron by means of dies formed so as to produce sharp corners at the ends of the squared portion, as set forth.

In witness whereof I have hereunto set my signature this 5th day of January, 1865.

ALVIN POND.

Witnesses:
CHAS. L. BEECHER,
LEROY P. MATTHEWS.